(12) United States Patent
Jaakkola et al.

(10) Patent No.: US 11,316,387 B2
(45) Date of Patent: Apr. 26, 2022

(54) WIRELESS CHARGING FEATURE FOR WIRELESS DEVICE AND WIRELESS CHARGING METHOD HAVING A BACKOFF FEATURE

(71) Applicant: HMD Global Oy, Espoo (FI)

(72) Inventors: Mikko Jaakkola, San Diego, CA (US); Eric Su, Taipei (TW)

(73) Assignee: HMD Global Oy, Espoo (FI)

( * ) Notice: Subject to any disclaimer, the term of this patent is extended or adjusted under 35 U.S.C. 154(b) by 10 days.

(21) Appl. No.: 16/759,910

(22) PCT Filed: Aug. 1, 2018

(86) PCT No.: PCT/FI2018/050569
§ 371 (c)(1),
(2) Date: Apr. 28, 2020

(87) PCT Pub. No.: WO2019/086750
PCT Pub. Date: May 9, 2019

(65) Prior Publication Data
US 2021/0184515 A1    Jun. 17, 2021

(30) Foreign Application Priority Data
Oct. 31, 2017   (EP) .................................... 17199368

(51) Int. Cl.
*H02J 50/90*   (2016.01)
*H02J 50/10*   (2016.01)
*H02J 7/00*    (2006.01)

(52) U.S. Cl.
CPC .............. *H02J 50/90* (2016.02); *H02J 50/10* (2016.02); *H02J 7/0047* (2013.01); *H02J 2310/22* (2020.01)

(58) Field of Classification Search
CPC ...................................................... H02J 50/90
(Continued)

(56) References Cited

U.S. PATENT DOCUMENTS

| 8,629,653 B2 | 1/2014 | Mochida et al. | 320/108 |
| 8,645,604 B2 | 2/2014 | Fino | 710/304 |

(Continued)

FOREIGN PATENT DOCUMENTS

| CN | 106287513 A | 1/2017 |
| EP | 2 632 013 A3 | 2/2015 |

(Continued)

*Primary Examiner* — Edward Tso
*Assistant Examiner* — Ahmed H Omar
(74) *Attorney, Agent, or Firm* — Harrington & Smith

(57) ABSTRACT

A wireless charging circuit for using a transmitting wireless device to charge a receiving wireless device is disclosed. The wireless charging circuit of the transmitting wireless device has a transmitting mode. The transmitting wireless device includes a wireless charging circuit and a position detector, the position detector electronically coupled to the wireless charging circuit and for activating the transmitting mode of the wireless charging circuit of the transmitting wireless device dependent upon the position of the transmitting wireless device (e.g., upside down). When a receiving wireless device is placed face up on an upside down transmitting wireless device that is in the transmitting mode with the transmitting mode activated, the transmitting wireless device automatically begins charging the battery of the receiving wireless device. A method of wireless charging of a wireless device and including a battery power conserving backoff feature is also disclosed.

16 Claims, 6 Drawing Sheets

(58) Field of Classification Search
USPC .......................................................... 320/108
See application file for complete search history.

(56) References Cited

U.S. PATENT DOCUMENTS

| | | |
|---|---|---|
| 9,148,717 B2 | 9/2015 | Shaffer |
| 9,331,526 B2 | 5/2016 | Stevens et al. |
| 9,627,130 B2 | 4/2017 | Golko et al. |
| 9,729,003 B1 | 8/2017 | Chow |
| 2009/0096413 A1* | 4/2009 | Partovi .................. H01F 27/36 320/108 |
| 2011/0309792 A1 | 12/2011 | Mochida et al. ............. 320/108 |
| 2012/0223590 A1 | 9/2012 | Low et al. .................... 307/104 |
| 2012/0246374 A1 | 9/2012 | Fino .............................. 710/303 |
| 2013/0281160 A1 | 10/2013 | Han et al. ...................... 455/566 |
| 2015/0233990 A1* | 8/2015 | Lee ......................... H02J 50/90 324/76.12 |
| 2015/0348397 A1 | 12/2015 | Pakula et al. |
| 2016/0094076 A1 | 3/2016 | Kasar et al. |
| 2016/0126779 A1 | 5/2016 | Park |
| 2016/0127011 A1 | 5/2016 | Phillips et al. |
| 2016/0172890 A1 | 6/2016 | Jeong |
| 2016/0218545 A1 | 7/2016 | Schroeder et al. |
| 2016/0374049 A1 | 12/2016 | Ha et al. |

FOREIGN PATENT DOCUMENTS

| | | |
|---|---|---|
| WO | WO 2010/093969 A2 | 8/2010 |
| WO | WO 2015/031170 A2 | 3/2015 |
| WO | WO 2017/134346 A1 | 8/2017 |

* cited by examiner

US 11,316,387 B2

WIRELESS CHARGING FEATURE FOR WIRELESS DEVICE AND WIRELESS CHARGING METHOD HAVING A BACKOFF FEATURE

CROSS REFERENCE TO RELATED APPLICATION

This patent application is a U.S. National Stage application of International Patent Application Number PCT/FI2018/050569 filed Aug. 1, 2018, which is hereby incorporated by reference in its entirety, and claims priority to EP 17199368.6 filed Oct. 31, 2017.

FIELD OF THE DISCLOSURE

This disclosure is related to a feature for wirelessly charging an electronic device such as a wireless mobile device, using another wireless device.

SUMMARY OF THE DISCLOSURE

Conventional wireless charging systems introduce electromagnetic fields (e.g., induced electromagnetic fields) to transfer energy once a receiving wireless device comes in close proximity to a transmitting wireless device. The receiving wireless device starts to receive energy from the electromagnetic field created by the transmitting wireless device. Once the receiving wireless device starts to charge from the field, energy is withdrawn from the transmitting wireless device.

DETAILED DESCRIPTION

Figure 1:
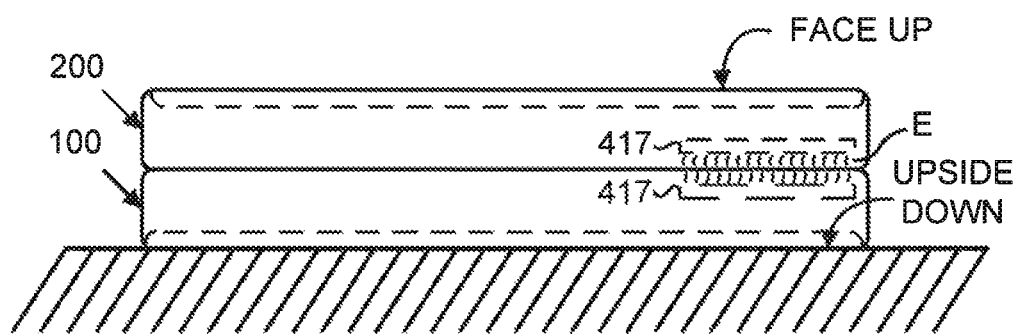
FIG. 1 depicts an elevation view of a wireless device charging another wireless device.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "coupled" is defined as connected, whether directly or indirectly through intervening components, and is not necessarily limited to physical connections. The connection can be such that the objects are permanently connected or releasably connected. The term "comprising" when utilized, means "including, but not necessarily limited to"; it specifically indicates open-ended inclusion or membership in the so-described combination, group, series, and the like.

FIG. 1 depicts an elevation view of a first wireless device 100 charging a second wireless device 200. The first wireless device 100 may sometimes be referred to as the "transmitting wireless device". The second wireless device 200 may sometimes be referred to as the "receiving wireless device". As can be schematically seen in FIG. 1, magnetic induction energy E passes between induction coils 417 of the transmitting and receiving wireless devices. The wireless devices may comprise any wireless device, including, mobile phones, tablets, laptops, etc. The transmitting and charging wireless devices may also be the same make and model devices or different devices entirely so long as they are both capable of wireless charging, such as by induction energy transmitting (transmitting wireless device) and receiving (receiving wireless device). For example, the transmitting wireless device may be a mobile phone and the receiving wireless device may be a wireless headset such as a Bluetooth® headset, as discussed in more detail below.

Figure 2A:
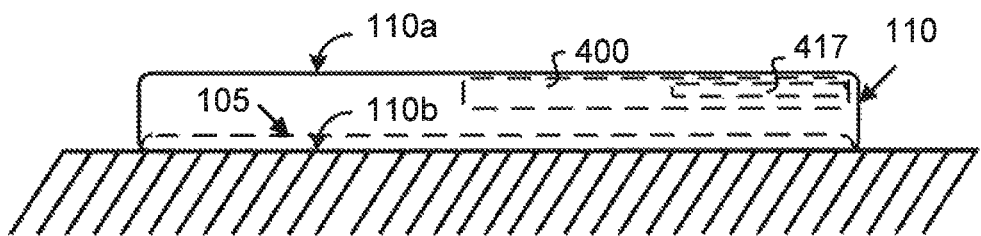
FIG. 2A depicts an elevation view of a wireless device for transmitting energy to, or receiving energy from, another wireless device.

As shown in FIG. 2A, wireless device 100 has a housing 110 comprising a rear side 110a and a front side 110b. The front side 110b contains a display screen 105 while the rear side 110a, shown schematically in FIG. 2B, typically contains a camera 112 and a flash 113. The rear side 110a may also include a charging indicator 460. A wireless charging feature 400 is contained within the housing 110. As described below, the wireless charging feature 400 includes an induction coil 417 positioned adjacent to the rear side 110a of the wireless device for use in transmitting or receiving charging energy from another wireless device.

Figure 3:
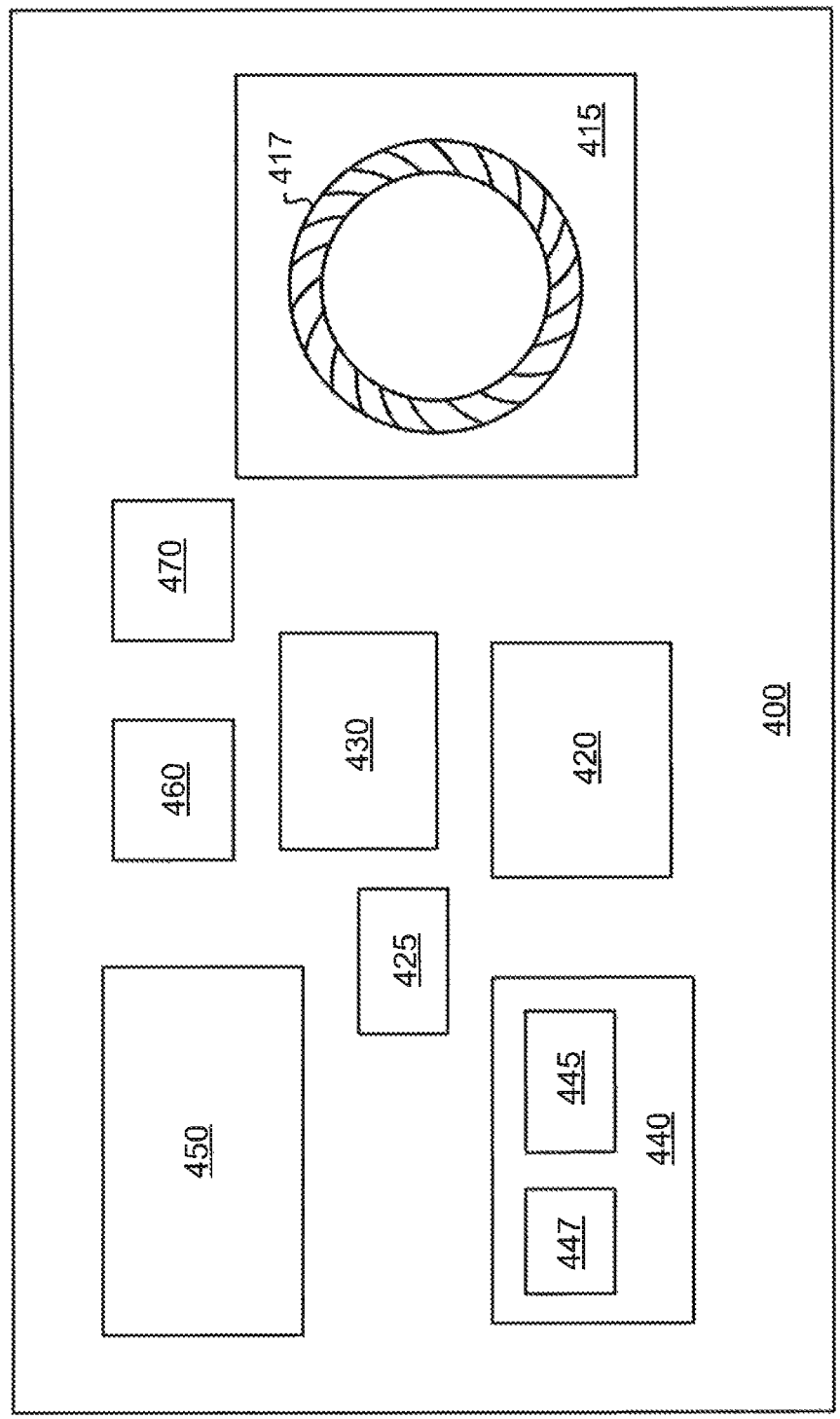
FIG. 3 depicts a simplified schematic view of a wireless charging feature for use with a wireless device for charging another wireless device.

As shown schematically in FIG. 3, the wireless charging feature 400 may include one or more of the following: electronically coupled together; a wireless charging circuit 415, typically in the form of a transmitting and/or receiving magnetic induction coil 417; a charging chip 420; a backoff chip/circuit 425; a battery 430; position detectors 440, typically in the form of a gyroscope 445 and/or an accelerometer 447; general wireless device circuitry 450 (that is, the conventional circuitry of a cellular phone which need not be described in detail here); a charging indicator 460; and a switch 470. Some of these features are described in more detail below. At least the magnetic induction coil 417 is located adjacent the rear side 110a of the wireless devices. The wireless charging feature 400 will have a transmitting mode and a receiving mode. When in the transmitting mode, wireless charging feature 400 allows the wireless device to charge a different wireless device. When in the receiving mode, wireless charging feature 400 allows the wireless device to be charged by a different wireless device. The wireless charging feature 400 may in the form of a wireless charging module including one, several or all components disclosed in FIG. 3 or these components may be arranged separately inside the transmitting wireless device. For purposes of this disclosure, emphasis is placed on the transmitting mode of the wireless charging feature.

The position detectors 440 are electronically coupled to the wireless charging circuit 415 and for activating transmitting mode of the wireless charging circuit 415 depending upon the position of the transmitting wireless device. When the position detectors 440 detect the transmitting wireless device is upside down (with its front side 110b down) and resting on a flat, horizontal side, the transmitting mode of the wireless charging circuit 415 is activated. Turning the transmitting wireless device upside down has the following functions and benefits. In several wireless devices, such as mobile phones and tablets, the front side 110b is often occupied by a display 105 as disclosed in FIG. 1. Thus, the transmitting induction coil 417 is better fitted adjacent to the rear side 110a. When the transmitting wireless device is upside down, the transmitting wireless device's induction coil 417 is positioned more conveniently for transmitting electromagnetic induction energy to the receiving wireless device's induction coil. Furthermore, it is unlikely that someone would use their wireless device when it is sitting upside down with the screen, speaker and microphone blocked. So, charging is not inconvenient to the user when the transmitting wireless device is upside down. Also, when the wireless device is opposite its regular use position, i.e. when it has been turned upside down, this functions to activate the transmission of electromagnetic induction energy from the transmitting wireless device's induction coil 417. This automatic activation of the transmitting mode only when the device is placed upside down on a horizontal surface is beneficial in battery operated devices in order to avoid unnecessary energy consumption. Transmission of electromagnetic induction consumes a lot of the transmitting wireless device's energy so it is beneficial not to transmit electromagnetic induction all the time, but only upon activation. Activation by turning the transmitting wireless device upside down is quick and easier for a user as compared to activating transmission of electromagnetic induction e.g. via a user interface.

When the position detector detects the transmitting wireless device is no longer upside down or resting on a flat, horizontal side, the transmitting mode of the wireless charging feature 400 is deactivated as it is assumed that the transmitting wireless device is going to be used, e.g., using general wireless device circuitry 450, for some reason other than charging, e.g., telephone call, web browsing, etc.

Figure 5B:
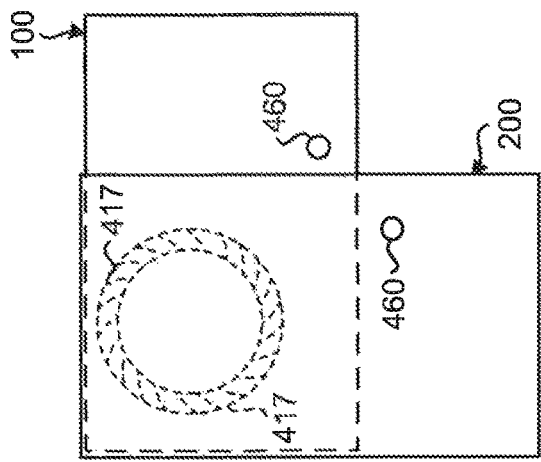
FIG. 5B depicts a second plan view of a first wireless device positioned relative to a second wireless device while the first wireless device charges the second wireless device.
Figure 5C:
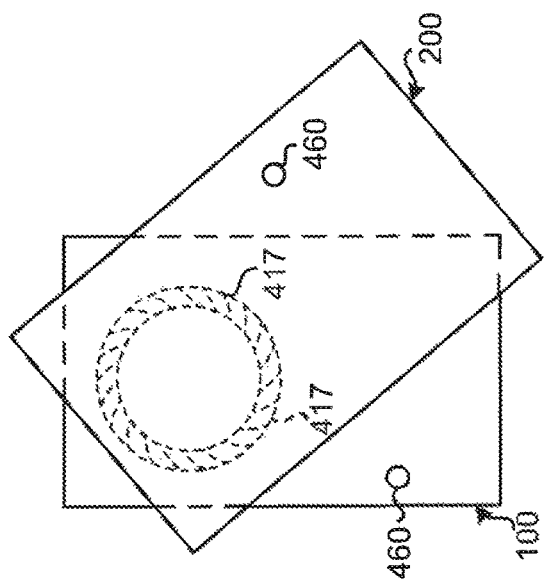
FIG. 5C depicts a third plan view of a first wireless device positioned relative to a second wireless device while the first wireless device charges the second wireless device.
Figure 5A:
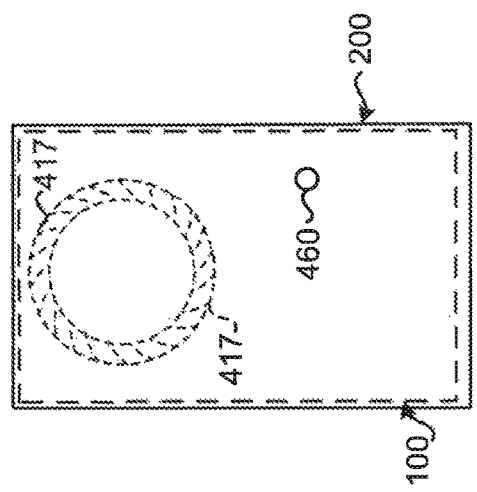
FIG. 5A depicts a first plan view of a first wireless device positioned relative to a second wireless device while the first wireless device charges the second wireless device.
Figure 5E:
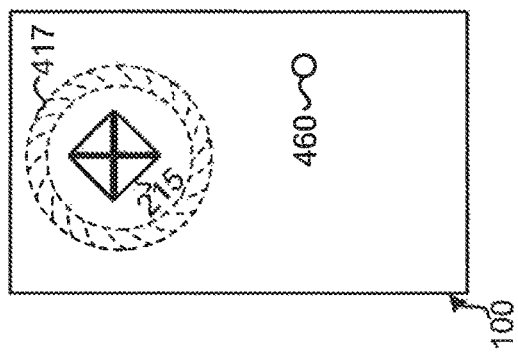
FIG. 5E depicts a fifth plan view of the combination shown in FIG. 5D and including a reference mark on the first wireless device for use in properly positioning the second wireless device.
Figure 5D:
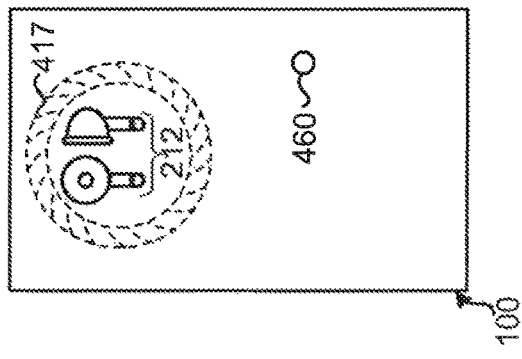
FIG. 5D depicts a fourth plan view of a first wireless device positioned relative to a second wireless device while the first wireless device charges the second wireless device and the second wireless device comprises a wireless ear bud.
Figure 5F:
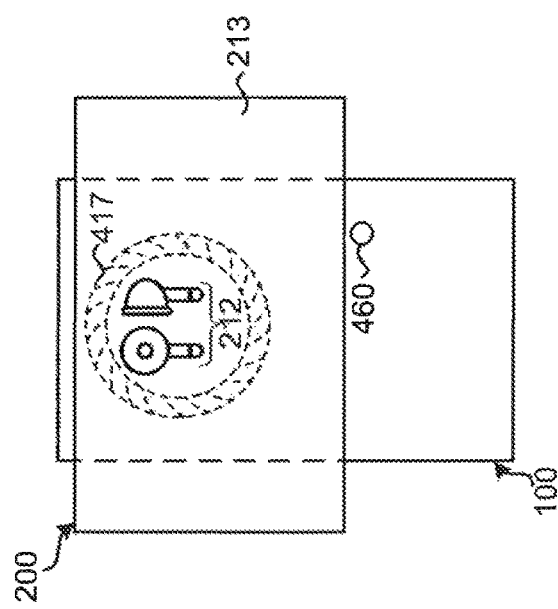
FIG. 5F depicts a sixth plan view of a first wireless device positioned relative to a second wireless device while the first wireless device charges the second wireless device and the second wireless device comprises a wireless headset and a charging station for the wireless headset.

As further described below, when the wireless charging feature 400 of the receiving device is activated either automatically when the receiving device is powered up or by use of an actual switch (that is having a mechanical toggle movable between "on" and "off" positions) or virtual switch (that is, an image of a mechanical switch image reproduced on the user interface and activated between the "on" and "off" conditions, by the swiping of a mechanical switch image between "on" and "off" positions) and a receiving wireless device is placed on top of a rear side of the transmitting wireless device, the wireless charging feature 400 of the transmitting and receiving wireless devices sync and the transmitting wireless device automatically begins charging the battery of the receiving wireless device's battery. Because the receiving mode uses very little battery power, it may always be activated. The transmitting mode consumes much more power and therefore should only be activated when needed. In the example disclosed in FIG. 1 the receiving wireless device 200 is similar as the transmitting wireless device 100 and thus the receiving wireless device 200 is place face-up so that the wireless charging circuits (here the induction coils 417) of both devices 100, 200 face each other. When the receiving wireless device 200 is of a different kind of wireless device from the transmitting wireless device, such as the receiving wireless device is a portion of a wireless headset, such as earbuds 212 (FIG. 5D), the receiving wireless device is placed on top of the rear surface of the transmitting wireless device 100. In an example, the wireless headset would be placed on top of the transmitting wireless device 100 at the location where the induction coil 417 is located. This location may be marked, e.g. by a figure or lines or some other reference mark 215 (FIG. 5E), on the rear side 110a of the cover of the transmitting wireless device. In another example, the receiving wireless device 200 is a bundle of a wireless headset 212 and a charging station 213 for the wireless headset (FIG. 5F). In this example, the charging station 213 includes an induction coil (not shown) for receiving energy from induction coil 417 and charging station is physically and electronically connected, such as by wire (not shown), to the wireless headset so that the wireless headset 212 is connected/coupled to the charging station 213 so that wireless headset 212 may be charged by charging station 213, which itself is charged by the transmitting wireless device 100.

Figure 2B:
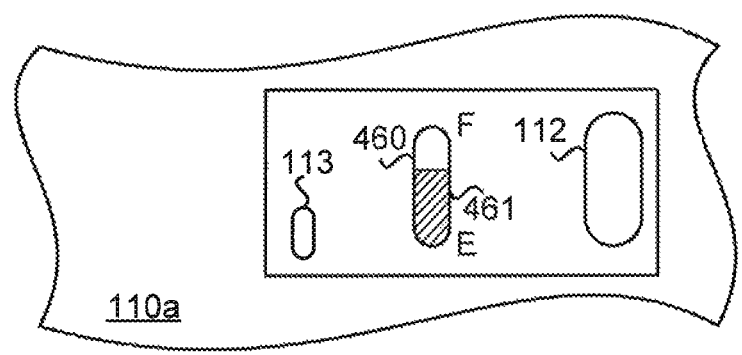
FIG. 2B depicts a plan view of a wireless device for transmitting energy to, or receiving energy from, another wireless device.

At least one of the transmitting or receiving wireless devices has a charging indicator 460 for informing a user whether the receiving wireless device is being charged or is fully charged. This charging indicator 460 is conventional, and may be a light, an analog or virtual gauge (that is, an image of a gauge that changes a display of charging conditions with the condition of whether or not charging is taking place), or an audible signal. In one example, the charging indicator 460 may also be a small display having a Full "F" to Empty "E" bar graph arranged on the rear side 110b of the transmitting wireless device (FIG. 2B). Further, the display such as display 105, but on the receiving wireless device 200 may be used as a charging indicator 460, i.e. the display facing up can be used to show to the user that the receiving wireless device 200 is being charged.

The charging chip 420 converts electromagnetic induction power received by the receiving wireless device 200 to energy for storage in its battery or converts battery power from the transmitting wireless device 100 to electromagnetic induction energy for transmitting to the receiving wireless device 200. Charging chips are conventional technology and need not be described herein.

When the transmitting wireless device's charging chip 420 is drawing power from the transmitting wireless device's battery, the charging indicator 460 of the transmitting wireless device may indicate that the transmitting wireless device is charging the battery of the receiving wireless device. When the receiving wireless device's charging chip 420 is receiving power from the transmitting wireless device, the if provided, the receiving wireless device's charging indicator 460 may indicate the battery of the receiving wireless device is being charged.

When the transmitting wireless device's charging chip 420 is not drawing power from the transmitting wireless device's battery, the charging indicator 460 of the transmitting wireless device may indicate that the transmitting device is not charging the battery of the receiving wireless device. When the receiving wireless device's charging chip 420 is not receiving power from the transmitting wireless device, the receiving wireless device's charging indicator 460 may indicate the battery of the receiving wireless device is not being charged. Alternatively, the transmitting wireless device can make the receiving wireless device send an indication when the transmitting wireless device knows that it is not charging the battery of the receiving wireless device.

As previously mentioned, conventional wireless charging systems use electromagnetic induction energy fields. However, the present disclosure, provides a solution to the problem that even if the transmitting wireless device is not actively charging anything, as also mentioned above, maintaining an active electromagnetic induction energy field while in the transmitting mode can be quite costly from an energy/battery consumption point of view. Thus, the present disclosure describes a backoff feature that turns the transmitting mode and electromagnetic induction energy field on and off per some algorithm or user selection through the wireless device would be advantageous. This backoff feature can be stored in a backoff chip/circuit 425 and described in more detail below.

Both the transmitting wireless device and the receiving wireless device may include actual or virtual switches (both previously described above) for manually activating or deactivating their respective transmitting modes of their wireless charging feature to conserve energy as also further described below.

A method of charging the receiving wireless device is described below with reference to the wireless charging structures described in FIGS. 1, 2A, 2B, and 3 above. As previously mentioned, conventional wireless charging systems use electromagnetic induction fields. However, even if the transmitting wireless device is not actively charging anything, as also described above, maintaining the active electromagnetic induction field while in the transmitting mode can be quite costly from an energy/battery consumption point of view. Thus, according to the present disclosure, this problem is solved by use of a backoff feature that turns the transmitting mode and magnetic induction field on and off per some algorithm would be advantageous.

Accordingly, the wireless devices may use a backoff algorithm stored in a backoff chip/circuit 425 to conserve energy of the transmitting wireless device when the transmitting wireless device is not charging another wireless device. The backoff functionality/algorithm may be implemented by a processor with the algorithm stored in a memory.

Figure 4:
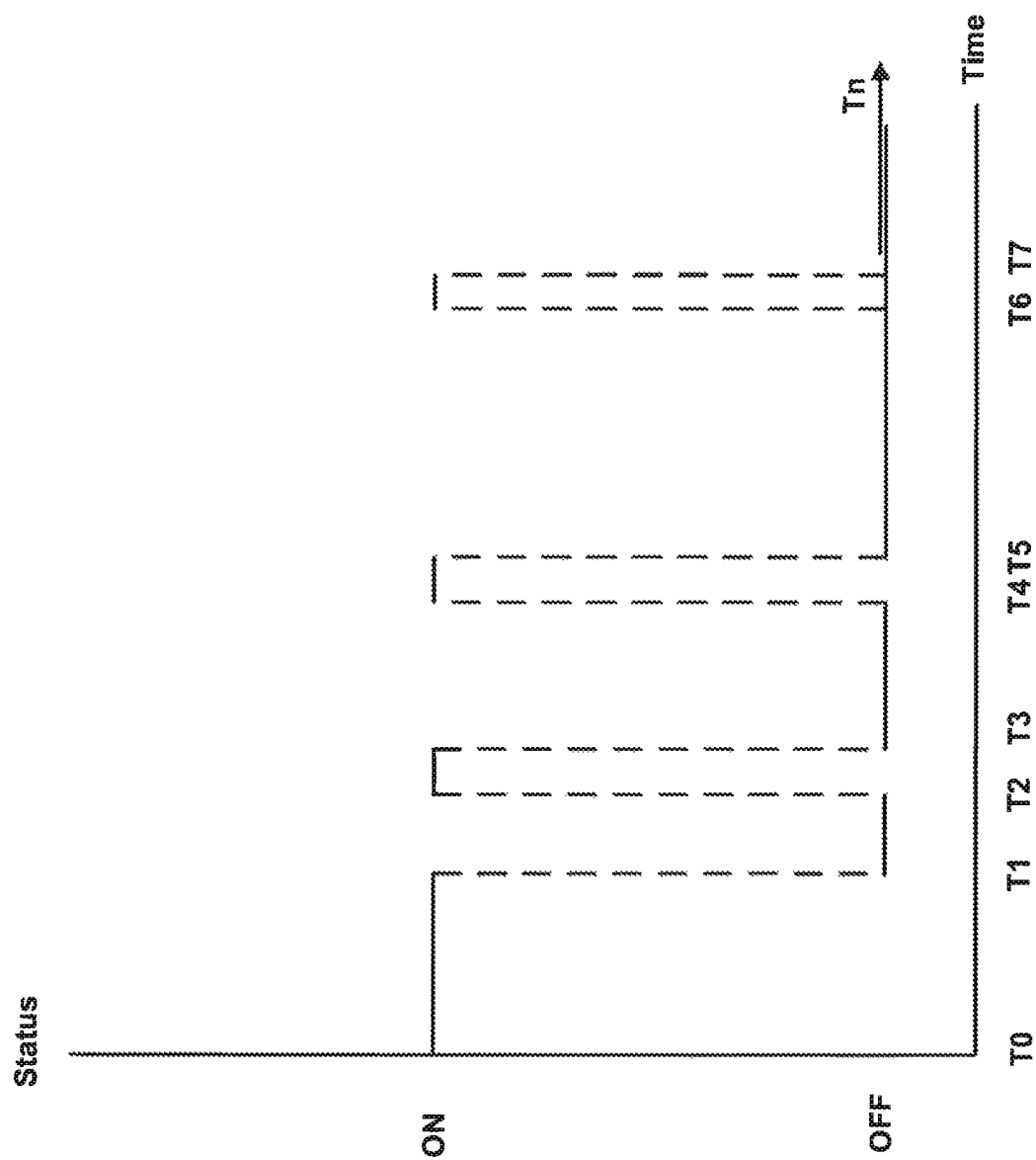
FIG. 4 depicts an exemplary backoff sequence for use with a wireless charging feature.

Most generally, as shown in FIG. 4, a backoff feature as contemplated by the present disclosure has a graph starts with the transmitting mode of the transmitting wireless device's wireless charging feature activated or on. The backoff algorithm waits a first predetermined "on time" period (e.g., T0 to T1). If during that time, the transmitting wireless device's charging chip does not detect a charging process has begun, the backoff algorithm turns off/deactivates the transmitting mode of the wireless charging feature of the transmitting wireless device for a first predetermined "off time" period (e.g., T1 to T2), preferably shorter than the first predetermined "on time" period (e.g., T0 to T1). After the first predetermined "off time" period (e.g., T1 to T2), the transmitting mode of the wireless charging feature of the transmitting wireless device is activated again for a second predetermined "on time" period (e.g., T2 to T3), preferably shorter than the first predetermined "on time" period (e.g., T0 to T1). This process is repeated, incrementally decreasing the predetermined time "on time" and "off time" periods until the transmitting mode of the wireless charging feature of the transmitting wireless device remains off until somebody touches (e.g., wakes) the transmitting wireless device. The predetermined backoff time periods can be easily changed through the controls of the wireless device, backoff chip/circuit 425, etc.

According to an exemplary backoff algorithm, stored, for example, in a backoff chip/circuit 425, when a user puts the upside down transmitting wireless device on the table, etc., the transmitting mode and the electromagnetic induction field should automatically be turned on. After 30 seconds, for example, if the transmitting wireless device's charging chip does not detect a charging process has begun, backoff chip/circuit 425 may turn the transmitting mode of the wireless charging feature 400 of the transmitting wireless device off for 10 seconds and then start it again for 2 s, then turn it off for 20 seconds and back on again for 2 s, until the transmitting mode of the transmitting wireless device is kept off until the transmitting wireless device is touched.

Switch 470, which may be an actual or virtual switch (both previously described above), that can be used to manually activate or deactivate the transmitting mode of the wireless charging feature 400 and override the backoff feature when even stricter battery control is desired.

As shown in FIGS. 5A, 5B, 5C, 5D, 5E, and 5F, and described above, the first wireless device 100 and the second wireless device 200 may mate up for charging in a variety of configurations so long as their induction coils generally overlap to allow inductive energy transfer.

Thus, in view of the above, a transmitting wireless device comprising a wireless charging feature may comprises a transmitting mode for wirelessly charging a receiving wireless device having a wireless charging capability, the transmitting wireless device having a wireless charging circuit comprising: a position detector, the position detector electronically coupled to the wireless charging circuit and for activating the transmitting mode of the wireless charging circuit dependent upon a position of the transmitting wireless device; and when the receiving wireless device is placed on the transmitting wireless device and the transmitting mode of the wireless charging circuit of the transmitting wireless device is activated by the position detector, the transmitting wireless device begins wireless transmission of electric power to the receiving wireless device through the wireless charging capability of the receiving wireless device for charging a battery of the receiving wireless device. When the receiving wireless device is placed on the transmitting wireless device, the transmitting wireless device's charging circuit detects that a charging process has begun. Thus, no separate detector is needed to detect whether the receiving wireless device has been placed on the transmitting wireless device, but the transmitting wireless device's charging circuit detects that it is charging through the status of the charging chip and thus knows the receiving wireless device was placed on the transmitting wireless device. Accordingly, the charging circuit of the transmitting wireless device is configured to detect start of charging, i.e. the start of transmitting energy, e.g. via electromagnetic induction. The charging circuit of the transmitting wireless device is configured to start transmission of energy via automatically when a once a receiving wireless device comes in close proximity to the transmitting wireless device (i.e. close to the charging circuit within it).

The embodiment of a transmitting wireless device comprising a wireless charging feature may include an induction coil for generating an electromagnetic induction energy field when the transmitting mode of the transmitting wireless device is activated, and the transmitting wireless device comprises a front side and a rear side and the induction coil being adjacent the rear side of the transmitting wireless device.

The embodiment of a transmitting wireless device comprising a wireless charging feature may further comprise wherein the transmitting wireless device comprises a front side and a rear side, and when the position detector detects the transmitting wireless device is with the front side down and resting on a flat, horizontal surface, the transmitting mode of the transmitting wireless device's wireless charging circuit is activated.

The embodiment of a transmitting wireless device comprising a wireless charging feature may further comprise wherein when the transmitting mode of the transmitting wireless device's wireless charging circuit is activated and a receiving wireless device is placed on top of the rear side of the transmitting wireless device, the wireless charging circuit of the transmitting wireless device automatically begins generating an electromagnetic induction energy field.

The embodiment of a transmitting wireless device comprising a wireless charging feature may further comprise wherein the wireless charging circuit of the transmitting wireless device further comprise a charging chip that converts battery power from the transmitting wireless device to electromagnetic induction power for transmitting to the receiving wireless device.

The embodiment of a transmitting wireless device comprising a wireless charging feature may further comprise wherein when the wireless charging circuit is in the transmitting mode and wireless transmission of electric power via the wireless charging circuit is occurring, the transmitting wireless device signals via a user interface that electric power is being wirelessly transmitted.

The embodiment of a transmitting wireless device comprising a wireless charging feature may further comprise wherein when the position detector detects the transmitting wireless device is no longer with its front side down or resting on the flat, horizontal surface, the transmitting mode of the wireless charging circuit of the transmitting wireless device is deactivated.

The embodiment of a transmitting wireless device comprising a wireless charging feature may further comprise a backoff circuit, wherein the backoff circuit turns the transmission mode of the wireless charging circuit on and off at certain time intervals when the transmission mode of the wireless charging circuit is activated but the transmitting wireless device is not charging the receiving wireless device.

An embodiment of a method of wireless charging may comprise: providing a transmitting wireless device comprising a wireless charging circuit and having a transmitting mode for wirelessly charging a receiving wireless device having a wireless charging capability, comprising: using a position detector electronically coupled to the wireless charging circuit for activating the transmitting mode of the wireless charging circuit dependent upon a position of the transmitting wireless device; and upon receiving the receiving wireless device on top of the transmitting wireless device and the transmitting mode of the wireless charging circuit transmitting wireless device is activated, the transmitting wireless device begins wireless transmission of electric power to the receiving wireless device through the wireless charging capability of the receiving wireless device for charging a battery of the receiving wireless device. When the receiving wireless device is placed on the transmitting wireless device, the transmitting wireless device's charging circuit detects that a charging process has begun. Thus, no separate detector is needed to detect whether the receiving wireless device has been placed on the transmitting wireless device, but the transmitting wireless device's charging circuit detects that it is charging through the status of the charging chip and thus knows the receiving wireless device was placed on the transmitting wireless device. Accordingly, the charging circuit of the transmitting wireless device is configured to detect start of charging, i.e. the start of transmitting energy, e.g. via electromagnetic induction. The charging circuit of the transmitting wireless device is configured to start transmission of energy via automatically when a once a receiving wireless device comes in close proximity to the transmitting wireless device (i.e. close to the charging circuit within it).

The embodiment of a method of wireless charging may further comprise providing the wireless charging feature with a backoff circuit to turn the transmission mode of the wireless charging circuit on and off at certain time intervals when the transmission mode of the wireless charging circuit is activated but the transmitting wireless device is not charging the receiving wireless device.

The embodiment of a method of wireless charging may further comprise wherein the backoff algorithm: waits a first predetermined "on time" period during which the transmitting mode of the transmitting wireless device's wireless charging circuit is activated; if a charging process does not begin during this period, the backoff algorithm turns the transmitting mode of the transmitting wireless device's wireless charging circuit off for a first predetermined "off time" period, shorter than the first predetermined "on time" period; after the first predetermined "off time" period, the transmitting mode of the transmitting wireless device's wireless charging circuit is activated again for a second predetermined "on time" period, shorter than the first predetermined "on time" period; and repeating the process and decreasing the predetermined "on time" and "off time" periods until the transmitting mode of the transmitting wireless device's wireless charging circuit remains off until the transmitting wireless device is touched.

The embodiment of a method of wireless charging may further comprise activating the transmitting mode of the transmitting wireless device and the receiving wireless device is placed on top of a rear side of the transmitting wireless device, the transmitting wireless device automatically begins charging the receiving wireless device.

The embodiment of a method of wireless charging may further comprise using an indicator for indicating whether the receiving wireless device is being charged by the transmitting wireless device.

The embodiment of a method of wireless charging may further comprise using the position detector to detect when the transmitting wireless device is no longer upside down and resting on a flat, horizontal side, and when the position of the transmitting wireless device is so detected, the transmitting mode of the transmitting wireless device is deactivated.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

The invention claimed is:

1. A transmitting wireless device comprising a wireless charging feature and having a transmitting mode for wirelessly charging a receiving wireless device having a wireless charging capability, the transmitting wireless device having a wireless charging circuit comprising:
   a position detector, the position detector electronically coupled to the wireless charging circuit and for activating the transmitting mode of the wireless charging circuit dependent upon a position of the transmitting wireless device; and
   when the receiving wireless device is placed on the transmitting wireless device and the transmitting mode of the wireless charging circuit of the transmitting wireless device is activated by the position detector, the transmitting wireless device begins wireless transmission of electric power to the receiving wireless device through the wireless charging capability of the receiving wireless device for charging a battery of the receiving wireless device.

2. The transmitting wireless device of claim 1, wherein the transmitting wireless device includes an induction coil for generating an electromagnetic induction energy field when the transmitting mode of the transmitting wireless device is activated, and the transmitting wireless device comprises a front side and a rear side and the induction coil being adjacent the rear side of the transmitting wireless device.

3. The transmitting wireless device of claim 1, wherein the transmitting wireless device comprises a front side and a rear side, and when the position detector detects the transmitting wireless device is with the front side down and resting on a flat, horizontal surface, the transmitting mode of the transmitting wireless device's wireless charging circuit is activated.

4. The transmitting wireless device of claim 2, wherein when the transmitting mode of the transmitting wireless device's wireless charging circuit is activated and a receiving wireless device is placed on top of the rear side of the transmitting wireless device, the wireless charging circuit of the transmitting wireless device automatically begins generating an electromagnetic induction energy field.

5. The transmitting wireless device of claim 4, wherein the wireless charging circuit of the transmitting wireless device further comprise a charging chip that converts battery power from the transmitting wireless device to electromagnetic induction power for transmitting to the receiving wireless device.

6. The transmitting wireless device of claim 5, wherein when the wireless charging circuit is in the transmitting mode and wireless transmission of electric power via the wireless charging circuit is occurring, the transmitting wireless device signals via a user interface that electric power is being wirelessly transmitted.

7. The transmitting wireless device of claim 3, wherein when the position detector detects the transmitting wireless device is no longer with its front side down or resting on the flat, horizontal surface, the transmitting mode of the wireless charging circuit of the transmitting wireless device is deactivated.

8. The transmitting wireless device of claim 1, further comprising a backoff circuit, wherein the backoff circuit turns the transmission mode of the wireless charging circuit on and off at certain time intervals when the transmission mode of the wireless charging circuit is activated but the transmitting wireless device is not charging the receiving wireless device.

9. A method of wireless charging comprising:
   providing a transmitting wireless device comprising a wireless charging circuit and having a transmitting mode for wirelessly charging a receiving wireless device having a wireless charging capability, comprising:
   using a position detector electronically coupled to the wireless charging circuit for activating the transmitting mode of the wireless charging circuit dependent upon a position of the transmitting wireless device; and
   upon receiving the receiving wireless device on top of the transmitting wireless device and the transmitting mode of the wireless charging circuit transmitting wireless device is activated, the transmitting wireless device begins wireless transmission of electric power to the receiving wireless device through the wireless charging capability of the receiving wireless device for charging a battery of the receiving wireless device.

10. The method of claim 9, further comprising using a backoff circuit to turn the transmission mode of the wireless charging circuit on and off at certain time intervals when the transmission mode of the wireless charging circuit is activated but the transmitting wireless device is not charging the receiving wireless device.

11. The method of claim 10, wherein the backoff algorithm:
   waits a first predetermined "on time" period during which the transmitting mode of the transmitting wireless device's wireless charging circuit is activated;
   if a charging process does not begin during this period, the backoff algorithm turns the transmitting mode of the transmitting wireless device's wireless charging circuit off for a first predetermined "off time" period, shorter than the first predetermined "on time" period;
   after the first predetermined "off time" period, the transmitting mode of the transmitting wireless device's wireless charging circuit is activated again for a second predetermined "on time" period, shorter than the first predetermined "on time" period; and
   repeating the process and decreasing the predetermined "on time" and "off time" periods until the transmitting mode of the transmitting wireless device's wireless charging circuit remains off until the transmitting wireless device is touched.

12. The method of claim 9, further comprising activating the transmitting mode of the transmitting wireless device and the receiving wireless device is placed on top of a rear side of the transmitting wireless device, the transmitting wireless device automatically begins charging the receiving wireless device.

13. The method of claim 9, further comprising using an indicator for indicating whether the receiving wireless device is being charged by the transmitting wireless device.

14. The method of claim 9, further comprising using the position detector to detect when the transmitting wireless device is no longer upside down and resting on a flat, horizontal side, and when the position of the transmitting wireless device is so detected, the transmitting mode of the transmitting wireless device is deactivated.

15. The transmitting wireless device of claim 1, wherein the transmitting wireless device is battery operated.

16. The method of claim 9, wherein the transmitting wireless device is battery operated.

\* \* \* \* \*